United States Patent
Amussen (10) Patent No.: US 9,341,306 B2
(45) Date of Patent: May 17, 2016

(54) ACCESSORY MOUNTING APPARATUS

(71) Applicant: Franz S. Amussen, Salt Lake City, UT (US)

(72) Inventor: Franz S. Amussen, Salt Lake City, UT (US)

(73) Assignee: SPYDERMOUNT LLC, Salt Lake City, UT (US)

( * ) Notice: Subject to any disclaimer, the term of this patent is extended or adjusted under 35 U.S.C. 154(b) by 0 days.

(21) Appl. No.: 14/618,410

(22) Filed: Feb. 10, 2015

(65) Prior Publication Data

US 2015/0226370 A1    Aug. 13, 2015

Related U.S. Application Data

(60) Provisional application No. 61/938,044, filed on Feb. 10, 2014.

(51) Int. Cl.

| F16M 13/00 | (2006.01) |
|---|---|
| F16M 11/40 | (2006.01) |
| G03B 17/56 | (2006.01) |
| F16M 11/16 | (2006.01) |
| F16M 13/02 | (2006.01) |

(52) U.S. Cl.
CPC ............. *F16M 11/40* (2013.01); *F16M 11/16* (2013.01); *F16M 13/00* (2013.01); *F16M 13/022* (2013.01); *G03B 17/561* (2013.01); *Y10T 29/49947* (2015.01)

(58) Field of Classification Search
CPC ..... F16M 11/40; F16M 11/16; F16M 13/022; F16M 13/00; G03B 17/561; Y10T 29/49947
USPC .............. 248/126, 175, 217.1, 218.4, 160
See application file for complete search history.

(56) References Cited

U.S. PATENT DOCUMENTS

| 2,684,822 | A  | * | 7/1954  | Odin ...................... | F16M 11/40 248/160 |
|---|---|---|---|---|---|
| 8,197,149 | B2 | * | 6/2012  | Darrow .................. | F16M 11/04 248/168 |
| 2002/0089201 | A1 |  | 7/2002  | Seegmiller et al. | |
| 2003/0057339 | A1 |  | 3/2003  | Watkins | |
| 2004/0081450 | A1 | * | 4/2004  | Joy ........................ | F16M 11/40 396/502 |
| 2005/0016044 | A1 | * | 1/2005  | Kubicek ................ | A47G 1/142 40/745 |
| 2005/0061933 | A1 |  | 3/2005  | Barth | |
| 2005/0205730 | A1 | * | 9/2005  | Carnevali ............... | F16M 11/02 248/163.1 |
| 2005/0258660 | A1 |  | 11/2005 | Wu | |
| 2008/0087789 | A1 | * | 4/2008  | Haynes ................. | A47B 23/007 248/454 |
| 2008/0158411 | A1 | * | 7/2008  | Firnberg ................ | F16M 11/10 348/373 |
| 2008/0302944 | A1 | * | 12/2008 | Freeman ................ | F16M 11/40 248/558 |
| 2010/0264281 | A1 |  | 10/2010 | Bevirt et al. | |
| 2012/0091307 | A1 | * | 4/2012  | Haynes ................. | A47B 23/043 248/451 |
| 2012/0288268 | A1 |  | 11/2012 | Bevirt | |

* cited by examiner

*Primary Examiner* — Gwendolyn Baxter
(74) *Attorney, Agent, or Firm* — Kunzler Law Group, PC (57) ABSTRACT

An apparatus for mounting accessories includes a base that has a mounting surface and at least one aperture. The apparatus further includes a mounting mechanism coupled to the mounting surface of the base, with the mounting mechanism being connectable with a mountable accessory. Further, the apparatus includes at least one resiliently bendable support coupled to the base via retractable engagement with the at least one aperture.

20 Claims, 7 Drawing Sheets

ACCESSORY MOUNTING APPARATUS

CROSS-REFERENCE TO RELATED APPLICATION

This application claims the benefit of U.S. Provisional Patent Application No. 61/938,044, filed on Feb. 10, 2014, which is incorporated herein by reference.

FIELD

This disclosure relates generally to mounting fixtures, and more particularly to an adjustable mounting apparatus.

BACKGROUND

Tripods and other mounting fixtures allow users to mount accessories, such as cameras and camcorders, to the fixture and position such accessories in a useful position. However, some conventional tripods and mounting fixtures do not provide sufficient mounting and positioning flexibility. Further, certain conventional tripods and mounting fixtures can be difficult to manipulate and adjust, especially in circumstances where the accessory is to be fixed relative to non-standard terrain or a non-standard structure.

SUMMARY

The subject matter of the present disclosure has been developed in response to the present state of the art concerning tripods and mounting fixtures. Accordingly, the subject matter of the present disclosure has been developed to provide a mounting apparatus that overcomes at least some shortcomings of the prior art.

According to one embodiment, disclosed herein is an apparatus for mounting accessories. The apparatus includes a base with a mounting surface and at least one aperture. The apparatus further includes a mounting mechanism coupled to the mounting surface of the base, with the mounting mechanism being connectable to a mountable accessory. Further, the apparatus includes at least one resiliently bendable support coupled to the base via retractable engagement with the at least one aperture.

According to one implementation, the at least one resiliently bendable support is made from an elongated cylindrical member that has a core. The core may be a carbon steel alloy. The resiliently bendable support further may include a plastic sheathing surrounding the core. The resiliently bendable support may further have a high density foam sheathing surrounding the core.

In one implementation, the mountable accessory is selected from the following group: a camera, a camcorder, a phone, a smart-phone, a laptop, a tablet, a mobile computing device, a portable electronic device, and a lighting fixture, among others. The mounting mechanism may include hardware for detachably securing the mountable accessory and the mounting mechanism may be detachably coupled to the mounting surface.

In one implementation, the at least one aperture extends completely through the base from one side to another side. In such an implementation, the at least one resiliently bendable support is secured in slide-preventing position with respect to the base when the at least one resiliently bendable support extends through two separate apertures of the base. For example, when one resiliently bendable support extends through two separate apertures, engagement between an exterior surface of the one resiliently bendable support and a surface defining openings of the two separate apertures is sufficient to prevent inadvertent sliding of the one resiliently bendable support through the apertures of the base. In another implementation, the two separate apertures are adjacent to each other. In one implementation, the base may include at least twice as many apertures as resiliently bendable supports.

According to another implementation, the base includes two portions coupled together with fasteners, wherein the at least one resiliently bendable support is clamped between the two portions of the base. In another implementation, each of the resiliently bendable supports may have a tip feature on at least one end that facilitates engagement with a surface, such as a table. Further, the base may include a slot to which an accessory strap is coupled.

Also disclosed herein is one embodiment of an apparatus for mounting accessories. The apparatus includes a base that includes two portions coupled together with fasteners. The base includes a mounting surface and at least one aperture defined by semi-cylindrical channels on inwardly facing surfaces of the two portions. The apparatus further includes a mounting mechanism coupled to the mounting surface of the base and at least one resiliently bendable support clamped between the two portions of the base within the at least one aperture.

According to one implementation, the at least one aperture terminates within the base. In another implementation, the fasteners that couple the two portions of the base together are configured to be loosened and tightened but are also configured to prevent the two portions of the base from completely decoupling. In other words, the fasteners may configured to prevent complete separation/decoupling between the two portions of the base while still allowing a degree of loosening so that at least one resiliently bendable support can be extended/retracted with respect to the base. In one implementation, the base includes a slot to which an accessory strap is coupled.

According to another embodiment, disclosed herein is a method for mounting an accessory. The method includes providing a base that has two portions coupled together with fasteners, wherein the base comprises a mounting surface and at least one aperture defined by semi-cylindrical channels on inwardly facing surfaces of the two portions. The method further includes providing a mounting mechanism coupled to the mounting surface of the base and providing at least one resiliently bendable support clamped between the two portions of the base within the at least one aperture. The method includes connecting an accessory to the mounting mechanism and loosening the fasteners on the base to separate the two portions of the base. The method also includes adjusting a position of the at least one resiliently bendable support within the at least one aperture and tightening the fasteners on the base to clamp the at least one resiliently bendable support between the two portions of the base. Further, the method includes affixing the at least one resiliently bendable support to a structure.

Reference throughout this specification to features, advantages, or similar language does not imply that all of the features and advantages that may be realized with the subject matter of the present disclosure should be or are in any single embodiment of the subject matter. Rather, language referring to the features and advantages is understood to mean that a specific feature, advantage, or characteristic described in connection with an embodiment is included in at least one embodiment of the subject matter of the present disclosure. Thus, discussion of the features and advantages, and similar language, throughout this specification may, but do not necessarily, refer to the same embodiment.

Furthermore, the described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter of the present disclosure will be readily understood, a more particular description of the subject matter will be rendered by reference to specific embodiments that are illustrated in the appended drawings. Understanding that these drawings depict only typical embodiments of the subject matter of the present disclosure and are not therefore to be considered to be limiting of its scope, the subject matter will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Figure 1:
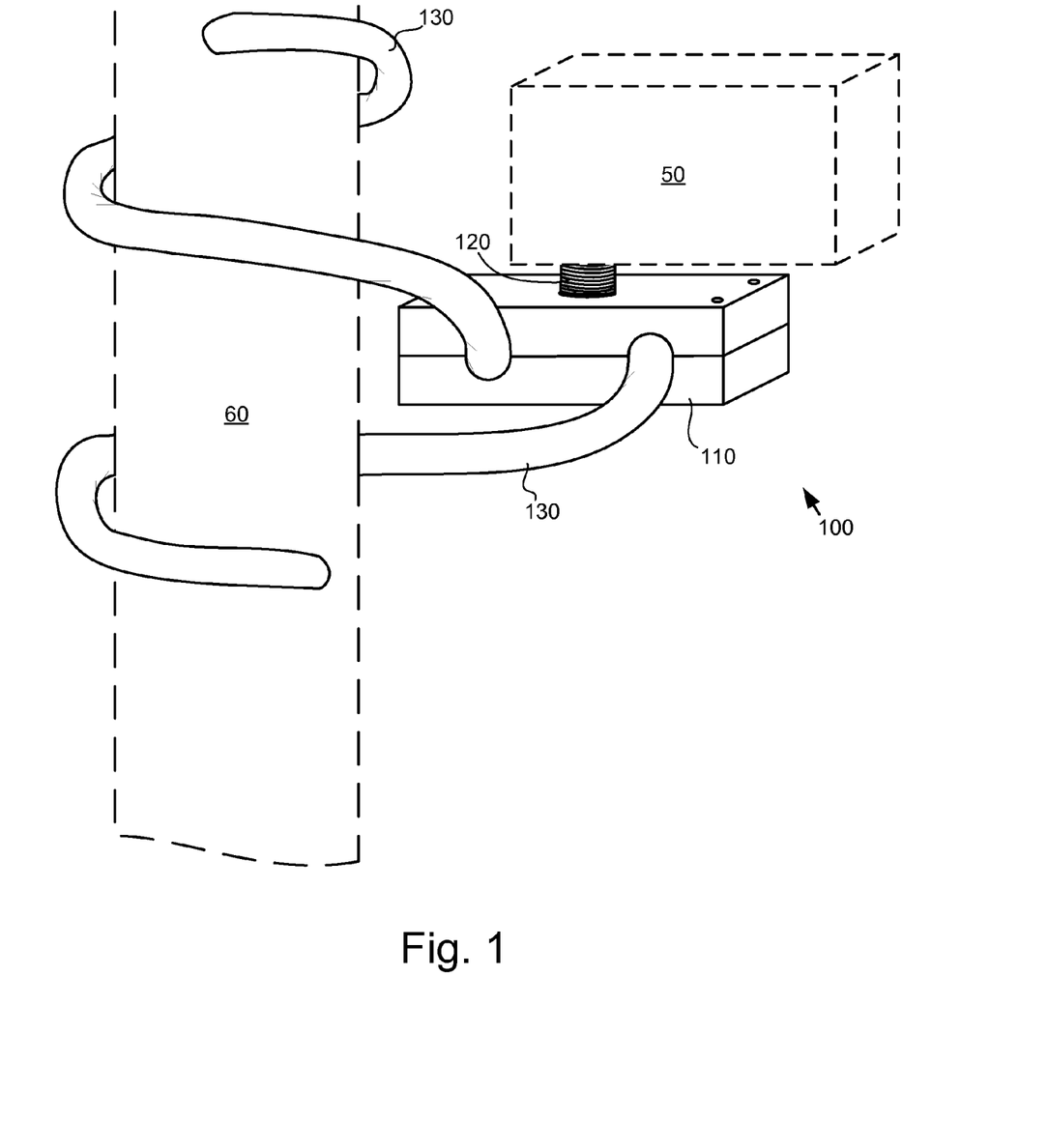
FIG. 1 depicts one embodiment of a mounting apparatus affixed to a structure.

FIG. 1 depicts one embodiment of a mounting apparatus 100 affixed to a structure 60. The mounting apparatus 100 includes a base 110, a mounting mechanism 120, and at least one resiliently bendable support 130. Although a single resiliently bendable support 130 can be implemented with the mounting apparatus 100, the disclosure may use the plural term "resiliently bendable supports" to mean "at least one resiliently bendable support." In other words, any statement disclosed herein that references "resiliently bendable supports" can be construed to mean "at least one resiliently bendable support" unless otherwise noted. Generally, the resiliently bendable supports 130 are adjustably (e.g., retractably) coupled to the base 110. The resiliently bendable supports 130 can extend and bend to position a device or accessory 50, which is mounted to the base 110 via the mounting mechanism 120, into a desirable position. Details regarding the base 110 are included below with reference to FIGS. 5A-6D, and details regarding the mounting mechanism are included below with reference to FIGS. 5C and 5D. Additionally, details regarding the resiliently bendable supports 130 are included below with reference to FIGS. 2A-4.

Although any of various accessories 50 can be mounted to and positioned by the apparatus 100, some examples of accessories 50, without limitation, can include a camera, a camcorder, a phone, a smart-phone, a laptop, a tablet, a mobile computing device, a portable electronic device, a mirror, and a lighting fixture, among others. In one embodiment, the accessory 50 may be permanently coupled to the mounting apparatus 100. In another embodiment, the mounting mechanism 120 of the mounting apparatus 100 may be configured so that an accessory 50 may be detached, and if desired replaced with another accessory 50. Although described in greater detail below, the mounting mechanism 120 may include an element, such as a threaded protrusion, that engages with a corresponding element on the accessory 50, such as a threaded receptacle.

The structure 60 to which the mounting apparatus 100 is affixed may be any of various surfaces, constructions, and formations. In one embodiment, the resiliently bendable supports 130 may be bent around a vertical pole, as depicted in FIG. 1, to hold the base 110 and the mounted accessory 50 in a specific orientation relative to the pole. For example, a user may mount a camera 50 onto the base 110 of the apparatus 100 using the mounting mechanism 120. The user may then position the resiliently bendable supports 130 around the structure 60 in such a way (e.g., wrapping around) that the camera 50 is securely supported in a desired position. In other embodiments, the apparatus 100 may be affixed to any of various other structures 60, such as flat horizontal surfaces, railings, bicycle frames, motorcycles, car frames, boats, buildings, sports equipment, appendages of users, and personal protective equipment, among others. Thus, the term "structure" throughout the present disclosure refers to any object, surface, component, construction, or formation upon which or to which the apparatus 100 can be affixed.

Figure 2A:
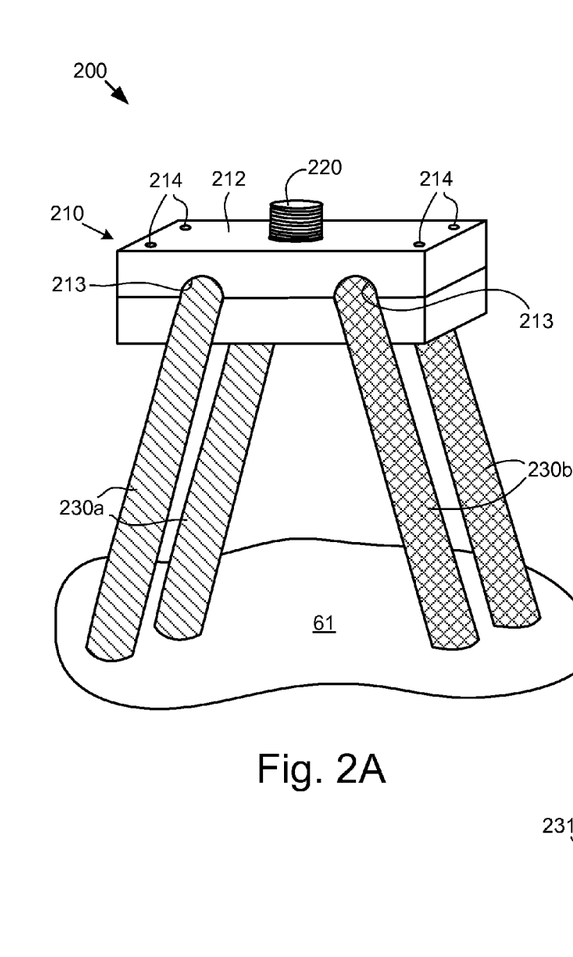
FIG. 2A is a perspective view of one embodiment of a mounting apparatus depicting two resiliently bendable supports in a standing position.

FIG. 2A is a perspective view of one embodiment of a mounting apparatus 200 depicting two resiliently bendable supports 230a, 230b in a standing position on a structure with a horizontal surface 61. The two resiliently bendable supports 230a, 230b in the depicted embodiment extend through apertures 213 in the base 210. With the apparatus 200 in the standing position as depicted in FIG. 2A, the two resiliently bendable supports 230a, 230b are each retractably coupled to the base 210 substantially at their respective midpoints. In other words, substantially equal lengths of each of the resiliently bendable supports 230a, 230b are extending from opposite sides of the base 210. Additionally both of the resiliently bendable supports 230a, 230b in the depicted embodiment are bent to have similar trajectories towards the ground 61, thus allowing the resiliently bendable supports 230a, 230b to serve as legs to support the apparatus 200 in the standing position. In another embodiment, the supports 230a, 230b may be arranged so that one side of the base 210 is elevated, thus altering the orientation and position of the accessory 50 (not shown).

In another embodiment, the resiliently bendable supports 230a, 230b may include a tip feature 231 on one or both ends of the resiliently bendable supports 230a, 230b. For example, the tip feature 231 may include a rubber cover that facilitates anti-slip engagement with a table or other surface. The tip feature may also be useful in preventing the complete removal the resiliently bendable support from the base. In other words, the resiliently bendable supports may be extendable and retractable up until the tip feature engages the base, at which point further extension/retraction of the resiliently bendable support is prevented due to the tip feature being larger than the aperture of the base.

Figure 2B:
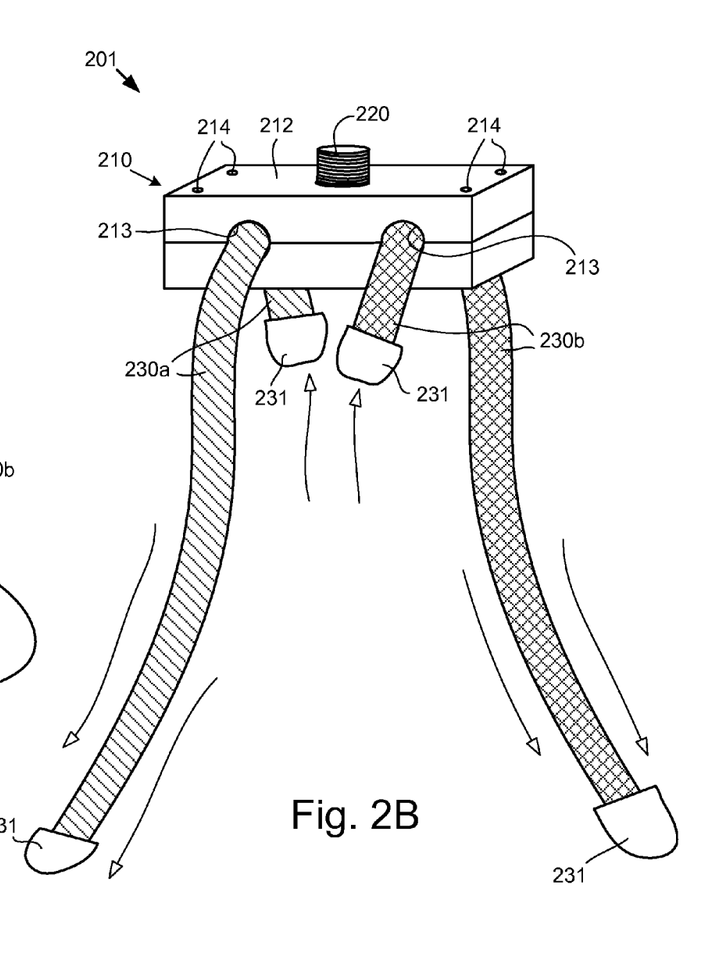
FIG. 2B is a perspective view of one embodiment of a mounting apparatus depicting two resiliently bendable supports in an alternate position.

FIG. 2B is a perspective view of one embodiment of the mounting apparatus 201 depicting two resiliently bendable supports 230a, 230b in an alternate position. The two resiliently bendable supports 230a, 230b in the depicted embodiment extend through apertures in the base 210. FIG. 2B includes arrows showing the retracting and extending directions of the resiliently bendable supports 230a, 230b as the apparatus transitions from the orientation depicted in FIG. 2A to the orientation depicted in FIG. 2B. In the embodiment depicted in FIG. 2B, the resiliently bendable supports 230a, 230b each have an extended portion (longer side) and a retracted portion (shorter side). In such an embodiment, the extended portions of the supports 230a, 230b can be used to wrap around a structure 60 in order to securely affix the apparatus 201 in a specific position. The elements and mechanism that facilitate the extending and retracting of the resiliently bendable supports 230 are described in greater detail below.

Figure 3A:
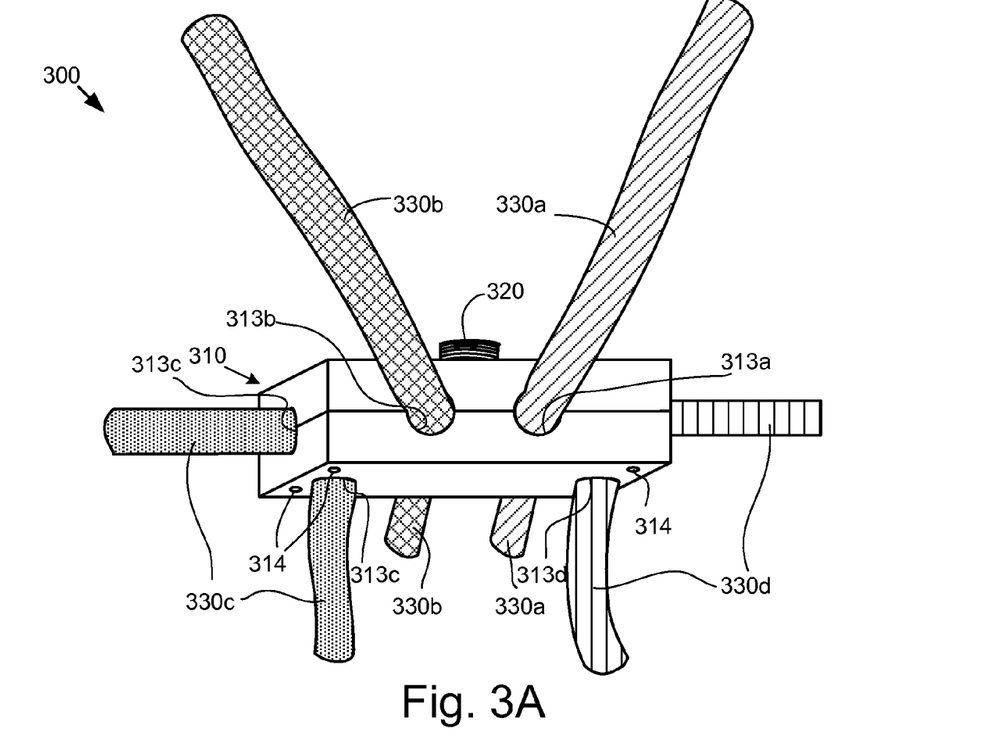
FIG. 3A is a perspective view of one embodiment of a mounting apparatus depicting four resiliently bendable supports.

FIG. 3A is a perspective view of another embodiment of the mounting apparatus 300 depicting four resiliently bendable supports 330a, 330b, 330c, 330d. The four resiliently bendable supports 330a, 330b, 330c, 330d extend through apertures 313a, 313b, 313c, 313d in the base 310. The first two resiliently bendable supports 330a, 330b are substantially similar to the supports described above with reference to FIGS. 2A and 2B. These first two supports 330a, 330b extend through the apertures 313 in the base 310 to opposing lateral sides of the base 310, according to one embodiment. However, the second two supports 330c, 330d extend through the base to lateral adjacent sides of the base 310 instead of to opposite sides of the base 310. Thus, depending on the specifics of a given application, different embodiments of the apparatus 300 may have apertures extending through the base 310 in various directions, thus allowing specific embodiments of the apparatus 300 to coordinate with specific end-uses (e.g., camera mount, laptop mount, etc.).

For example, the second two resiliently bendable supports 330c, 330d extending through lateral adjacent sides of the base 310 may be used to securely fasten the apparatus 300 between two structures 60 (not depicted) while the first two resiliently bendable supports 330a, 330b extending through opposite lateral sides of the base 310 may be used to slightly modify the and/or stabilize the exact position of the apparatus 300 and the attached accessory 50 (not depicted) with respect to the structure 60. Further, one or more of the first two resiliently bendable supports 330a, 330b may be used to link to another mounting apparatus, thus allowing two or more mounting apparatus' to be chained together. In one embodiment, as described in greater detail with reference to FIG. 5B, the base 310 includes two portions that are securely pressed together to clamp the resiliently bendable supports 330 between the two portions of the base 310. In such embodiments, the fasteners 314 may only need to be loosened to allow the supports 330 to retract and extend before re-tightening the fasteners to re-secure the supports 330 in place.

Although the present disclosure illustrates and describes certain implementations, it is expected that other non-illustrated implementations regarding the number, configuration, placement, and arrangement of the resiliently bendable supports 130, fall within the scope of the present disclosure. Additional details regarding various other embodiments of the apertures 113 are included below with reference to FIGS. 6A-6D.

Figure 3B:
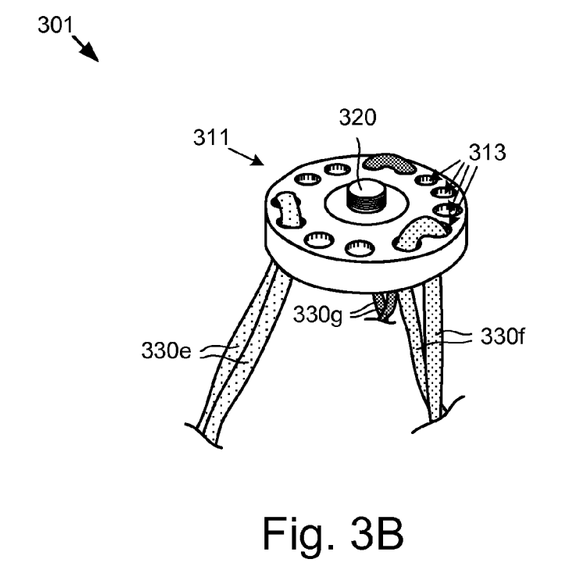
FIG. 3B is a perspective view of one embodiment of a mounting apparatus depicting each resiliently bendable support extending through two apertures of a base of the mounting apparatus.

FIG. 3B is a perspective view of one embodiment of the mounting apparatus 301 depicting each resiliently bendable support 330e, 330f, 330g extending through a respective pair of apertures 313 of the base 311. According to one embodiment, each one of the resiliently bendable supports may be prevented from slipping through the base by positioning and orienting the bendable supports within two apertures. In the illustrated embodiment, each of the resiliently bendable supports extends through adjacent apertures. More specifically, a bendable support can be threaded up through one aperture and down through an adjacent aperture. Friction between the resiliently bendable supports 330e, 330f, 330g and the respective apertures 313 of the base 311 in the depicted configuration prevent the supports 330 from inadvertently slipping through the apertures. For example, the engagement between the exterior surface of the resiliently bendable supports and the surface of the base that forms the aperture opening may provide sufficient friction to prevent the supports from inadvertently sliding through the apertures. In one embodiment, the apertures 313 that are not occupied with a resiliently bendable support may be used for coupling extra accessories to the apparatus 301.

Figure 4:
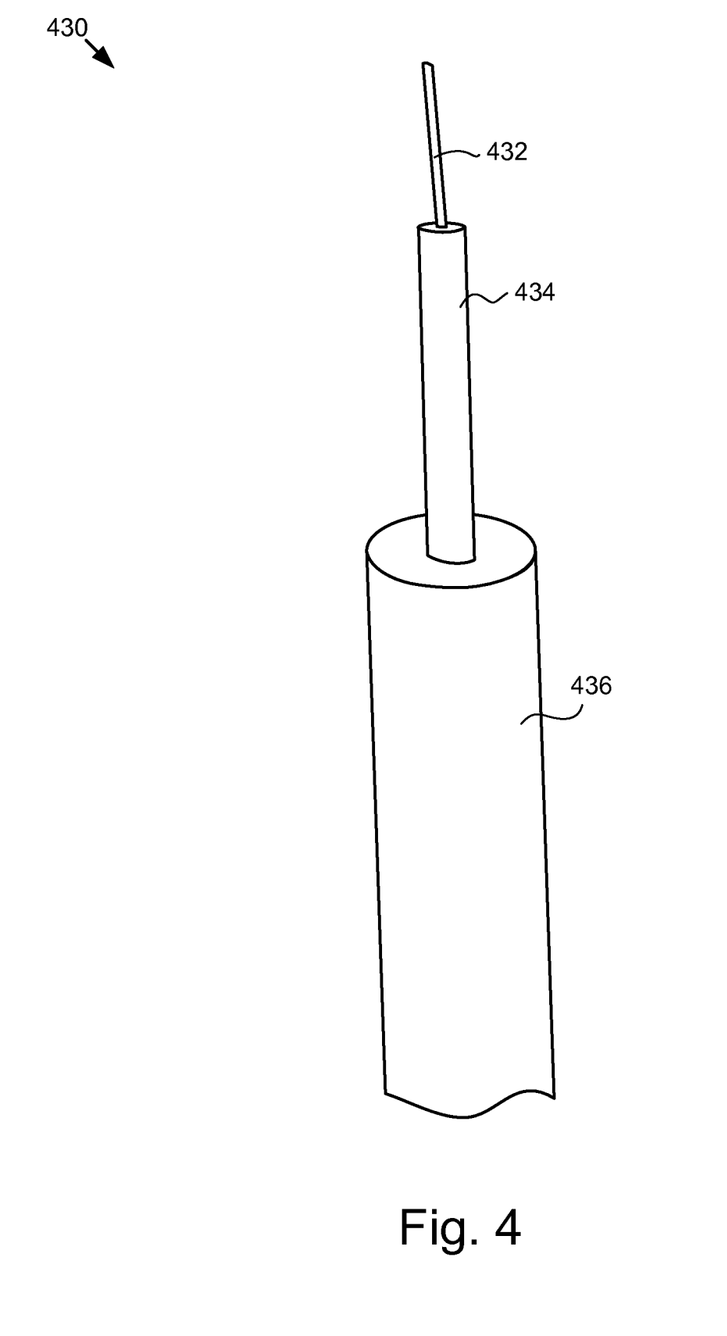
FIG. 4 is a perspective cutaway view of one embodiment of a resiliently bendable support.

FIG. 4 is a perspective cutaway view of one embodiment of a resiliently bendable support 430. In the depicted embodiment, the resiliently bendable support 430 is a cylindrical member that includes various concentric layers. The central layer includes a core 432 extending the length of the resiliently bendable support 430. The core 432 imparts the 'resiliently bendable' structure to the supports 430. In other words, the core 432 is designed to repeatedly bend (without fracturing) when a user exerts a force on the support 430, thus allowing the support to be resiliently twisted and curved to assume a desired position. In one embodiment, the core 432 is a steel alloy material. In another embodiment, the core could also be steel, copper, lead, aluminum, plastic, or any other resiliently bendable material suitable for the application.

Surrounding the core 432 may be a plastic sheathing layer 434. The plastic sheathing layer 434 protects the core by preventing moisture and other corrosive enhancing constituents from contacting the core. The plastic sheathing layer 434 may be a polymer, silicone, rubber, or plastic material. The outermost layer, according to the depicted embodiment, is a high-density foam sheathing 436. The high-density foam sheathing 436 enhances the grip of the resiliently bendable support 430 when it is engaged on a surface of a structure 60 and prevents (or at least inhibits) slippage between the supports 430 and the structure. Additionally, the high-density foam sheathing 436 further protects the plastic sheathing 434 and the core 432. The high-density foam sheathing 436 also provides a comfortable surface for a user to handle when bending the supports 430 to secure the apparatus 400 in a desired position.

Although all three layers 432, 434, 436 are show in FIG. 4, it is expected that in certain embodiments only one or two of the layers 432, 434, 436 may be implemented. For example, since the core 432 imparts the "resiliently bendable" property to the support 430, in one embodiment, the support 430 may only include a core 432. In another embodiment, the plastic sheathing 434 and the high-density foam sheathing 436 may substantially be combined into a single, protective layer. In another embodiment the resiliently bendable core and a polymer, rubber, silicone, plastic material may be substantially combined into a single, protective, layer without the use or inclusion of the high-density foam. It is also contemplated that the cross-sectional shape of the resiliently bendable supports 430 may also be non-circular. For example, the resiliently bendable supports 430 may have a rectangular, square, or triangular cross-sectional shape, among others. Depending on the specifics of a given application, the resiliently bendable supports 430 may be between a few inches long and a few feet long. Further, the thickness of the resiliently bendable supports 430 is also dependent on the specifics of a given application. For example, if an embodiment of the apparatus 100 is designed to support a mounted laptop, the thickness of the resiliently bendable supports 430 may be an inch thick or more. However, if the apparatus 100 is designed to support a small, hand-held camera or a smart-phone, the resiliently bendable supports 430 may have a thickness of less than one inch.

FIGS. 5A-5D depict various embodiments of the mounting apparatus with the resiliently bendable supports removed from the apertures 513 in the base 510. These figures illustrate various details and various embodiments of the base 510 and the mounting mechanism 520.

Figure 5A:
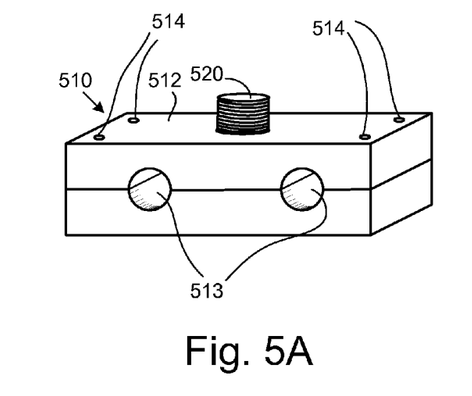
FIG. 5A is a perspective view of one embodiment of a mounting apparatus with the resiliently bendable supports removed.

FIG. 5A is a perspective view of one embodiment of the mounting apparatus with the resiliently bendable supports entirely removed from the apertures 513 in the base 510. The depicted embodiment includes a mounting mechanism 520 coupled to the mounting surface 512 of the base 510. The mounting mechanism 520 may be integrally formed with the base 510 or may be permanently coupled to the base 510 (e.g., a weldment). In another embodiment, the mounting mechanism 520 may be detachably yet securely coupled to the base 510, thus allowing mounting mechanisms to be replaced according to the type of accessory 50 to be mounted. The base 510 may also include fasteners 514 for holding together two portions of the base 510 (see FIG. 5B).

Figure 5B:
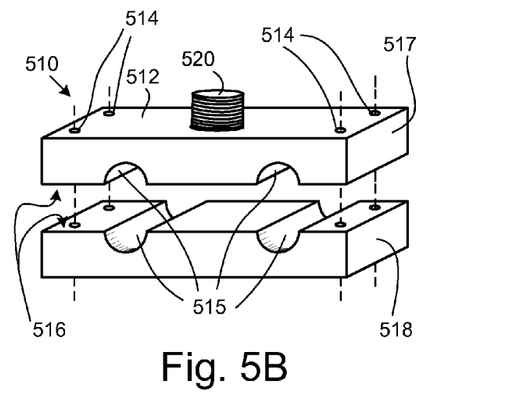
FIG. 5B is a perspective view of one embodiment of a mounting apparatus depicting a base separated into two portions.

FIG. 5B is a perspective view of one embodiment of the mounting apparatus depicting the base 510 separated into two portions. The apertures extending through the base 510 in the depicted embodiment are formed by corresponding semi-cylindrical channels 515 on the inwardly facing surfaces 516 of the two portions 517, 518 of the base 510. The fasteners 514, as briefly described above, are used to securely couple the two portions 517, 518 of the base 510 together. Thus, when the resiliently bendable supports are inserted into the channels 515, the two portions 517, 518 of the base 510 may be securely pressed together, thus clamping the resiliently bendable supports between the two portions 517, 518 of the base 510. In such embodiments, the fasteners 514 may only need to be loosened to allow the supports to retract and extend before re-tightening the fasteners to secure the supports in place once again. In one embodiment, as depicted, the apparatus includes multiple fasteners 514, such as screws or bolts, that extend through the base 510 in a direction substantially perpendicular to the longitudinal axis of the channels 515. In another embodiment, the fasteners 514 may be quick-release couplers that allow for a user to rapidly adjust the length of the portion of the resiliently bendable support that is extending from the base.

Figure 5C:
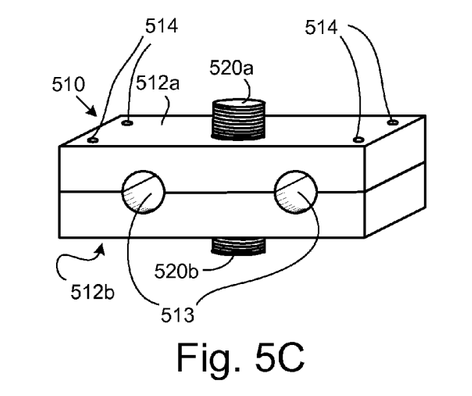
FIG. 5C is a perspective view of one embodiment of a mounting apparatus depicting two mounting mechanisms coupled to two mounting surfaces of the base.

FIG. 5C is a perspective view of one embodiment of the mounting apparatus depicting two mounting mechanisms 520a, 520b coupled to two mounting surfaces 512a, 512b of the base 510. In the depicted embodiment, the apparatus includes two mounting mechanisms 520a, 520b, thus enabling two accessories 50 (not depicted) to be mounted to the base 510. While the depicted embodiment shows the mounting mechanisms 520a, 520b on opposite sides of the base 510, it is expected that the two mounting mechanisms 520a, 520b may be on lateral adjacent sides of the base 510. Further, it is contemplated that the apparatus may have more than two mounting mechanisms. For example, the base 510 may have three or more mounting mechanisms for attaching three or more cameras to the base 510, thus allowing three different perspectives to be captured from substantially the same vantage point. Also, it is contemplated that a single mounting surface 512 may have multiple mounting mechanisms 520 affixed thereto.

Figure 5D:
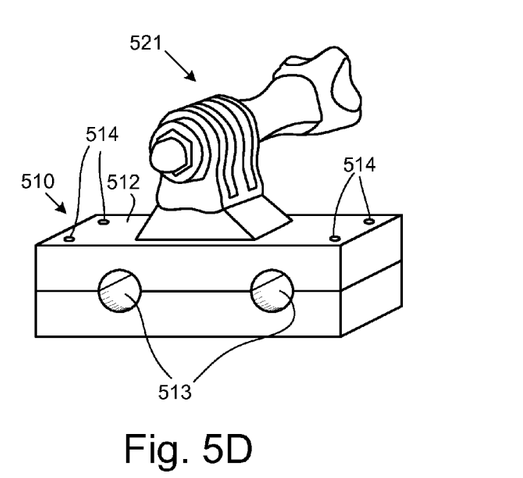
FIG. 5D is a perspective view of one embodiment of a mounting apparatus depicting an alternate mounting mechanism.

FIG. 5D is a perspective view of one embodiment of the mounting apparatus depicting an alternate mounting mechanism 521. As described above, the mounting mechanism may include an element, such as a threaded protrusion, that engages with a corresponding element on the accessory, such as a threaded receptacle (FIGS. 5A-5C). However, the mounting mechanism may include other types of mounting elements. For example, certain cameras and smart-phones require specific hardware for mounting. The mounting mechanism 521 in FIG. 5D, for instance, is specifically designed to engage corresponding mounting elements on a GoPro® camera. Once again, the mounting mechanism 521 may be integrally formed with the base 510 or may be permanently coupled to the base 510 (e.g., weldment) while in other embodiments the mounting mechanism 521 may be detachably yet securely coupled to the base 510, thus allowing mounting mechanisms to be replaced according to the type of accessory 50 to be mounted. In one embodiment, the mounting mechanism may be a quick-release mechanism for rapidly switching out different accessories.

In another embodiment, the base 510 may include one or more slots, slits, or gaps through which a strap, cord, rope, tie, or fastener may pass through. For example, a slot may extend through the base 510 and a strap or a webbing material may be inserted through the slot, thus allowing a user to utilize the strap(s) in securing and positioning the apparatus (i.e., suspending the apparatus between two objects). The slots may extend through the base 510 in a direction perpendicular to the apertures 513 or the slots may extend through the base in substantially the same direction. In yet another embodiment, the slots may extend through lateral sides of the base 510. In one embodiment, a carrying strap or a support band may be inserted through the one or more slots, thus allowing a user to easily carry and/or tote the apparatus.

FIGS. 6A-6D are top views of various embodiments of the base 610 and various embodiments of the aperture pathways 613 extending through the base 610. The aperture pathways 613 are illustrated in the figures as dotted lines to show the position of the apertures as they extend through the interior of the base 610. Each figure also depicts a mounting mechanism 120 coupled to the base 610 and various fasteners 614 for holding the portions of the base 610 together.

Figure 6A:
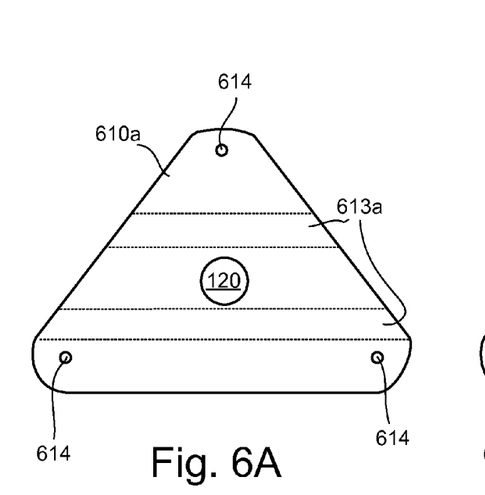
FIG. 6A is a top view of one embodiment of a mounting apparatus depicting two apertures extending through the base.
Figure 6B:
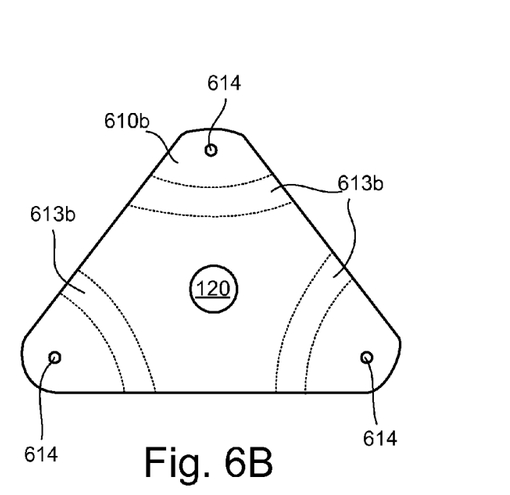
FIG. 6B is a top view of one embodiment of a mounting apparatus depicting three apertures extending through the base.

FIG. 6A is a top view of one embodiment of the mounting apparatus depicting two apertures 613a extending through the base 610a. In the depicted embodiment, the apertures 613a are substantially parallel to each other and extend through a triangular-shaped base 610a. FIG. 6B is a top view of another embodiment of the mounting apparatus depicting three apertures 613b extending through the base 610b. In the depicted embodiment, the apertures pathways 613b are curved, thus potentially increasing the strength of the engagement between the resiliently bendable supports (not depicted) and base 610b. For example, the curved aperture pathways 613b may inhibit the resiliently bendable supports from inadvertently slipping out of engaged contact with the base 610b. In such an embodiment, three resiliently bendable supports may be inserted into the apertures 613b of the triangular base 610b, thus each lateral side of the triangular base 610b may have two support portions extending outwardly. Similarly, as described above with reference to FIG. 3B, the base may not clamp about the supports but instead the position and orientation of the resiliently bendable supports with respect to the aperture pathways of the base may create sufficient sliding resistance to securely hold the supports in a desired position.

In another embodiment, a resiliently bendable support may extend through a first and a second aperture. For example, a single support may extend through a first aperture before looping back into a second aperture (see FIG. 3B). In such an embodiment, the loop portion of the single support may be engaged on a hook or other structure, thus allowing the apparatus to be in a hanging position. Further, such a configuration may further increase the strength of the engagement between the base and the support by preventing the support from inadvertently slipping out of the apertures.

Figure 6C:
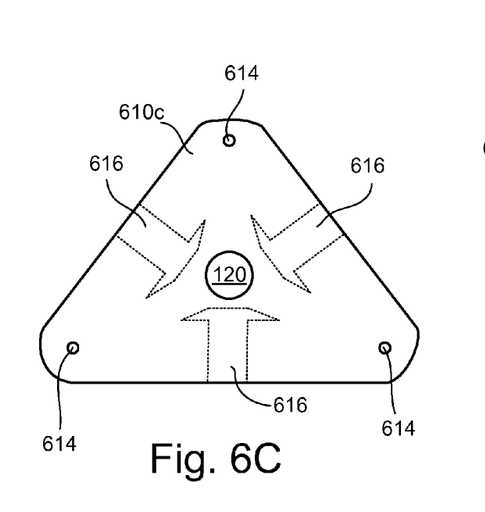
FIG. 6C is a top view of one embodiment of a mounting apparatus depicting three terminating apertures in the base.

FIG. 6C is a top view of yet another embodiment of the mounting apparatus depicting three terminating apertures pathways 616 in a triangular base 610c. In the depicted embodiment, the apertures may, instead of extending completely through the base 610c, terminate within the base 610c. The terminating aperture pathways 616 may still allow for resiliently bendable supports to be clamped between the portions of the base 610c and may still allow for the resiliently bendable supports to be retracted/removed from the base 610c. In the depicted embodiment, the aperture 616 includes grooves in the terminating end of the aperture for securely engaging specific embodiment of the resiliently bendable supports. For example, the resiliently bendable supports may have an anchoring portion that has fins that protrude perpendicularly outwards from the longitudinal axis of the support. These fins may engage the grooves at the terminating end of the apertures 616, thus securely holding the supports in place and preventing them from slipping out of the base 610c. In such embodiments, a comparatively longer and/or stronger support may be implemented with protruding fins at the anchoring portion in applications where a stronger attachment is required.

Figure 6D:
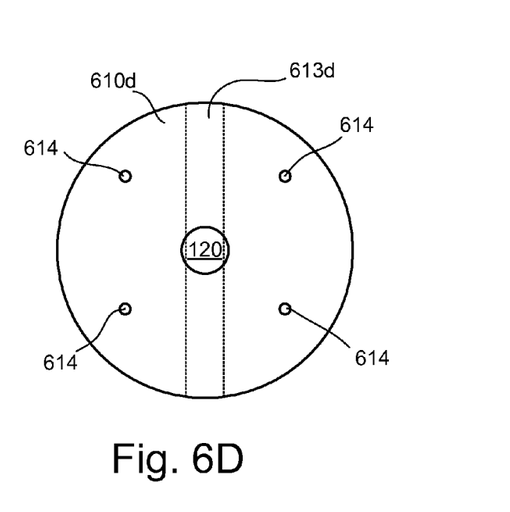
FIG. 6D is a top view of one embodiment of a mounting apparatus with a single aperture extending through the base.

FIG. 6D is a top view of another embodiment of the mounting apparatus with a single aperture 613d extending through the base 610d. In the depicted embodiment, the shape of the base 610d is circular and only a single aperture 613d extends through the interior of the base 610d. As described above, the base may have different shapes other than those described and depicted. Also, the various embodiments of the aperture pathways depicted and described above are not limited to the depicted embodiments of the bases. In other words, for example, a circular-shaped base may have two apertures extending straight through its interior and a third aperture that terminates within the base. Therefore, the various details accompanying the various embodiments and various figures may be combined in any suitable manner to implement a specific mounting apparatus.

In one specific embodiment, the mounting apparatus includes a base that has two portions coupled together with fasteners. The base also includes a mounting surface and at least one aperture defined by semi-cylindrical channels on inwardly facing surfaces of the two portions. The specific embodiment of the mounting apparatus further includes a mounting mechanism coupled to the mounting surface of the base and at least one resiliently bendable support clamped between the two portions of the base within the at least one aperture.

Figure 7:
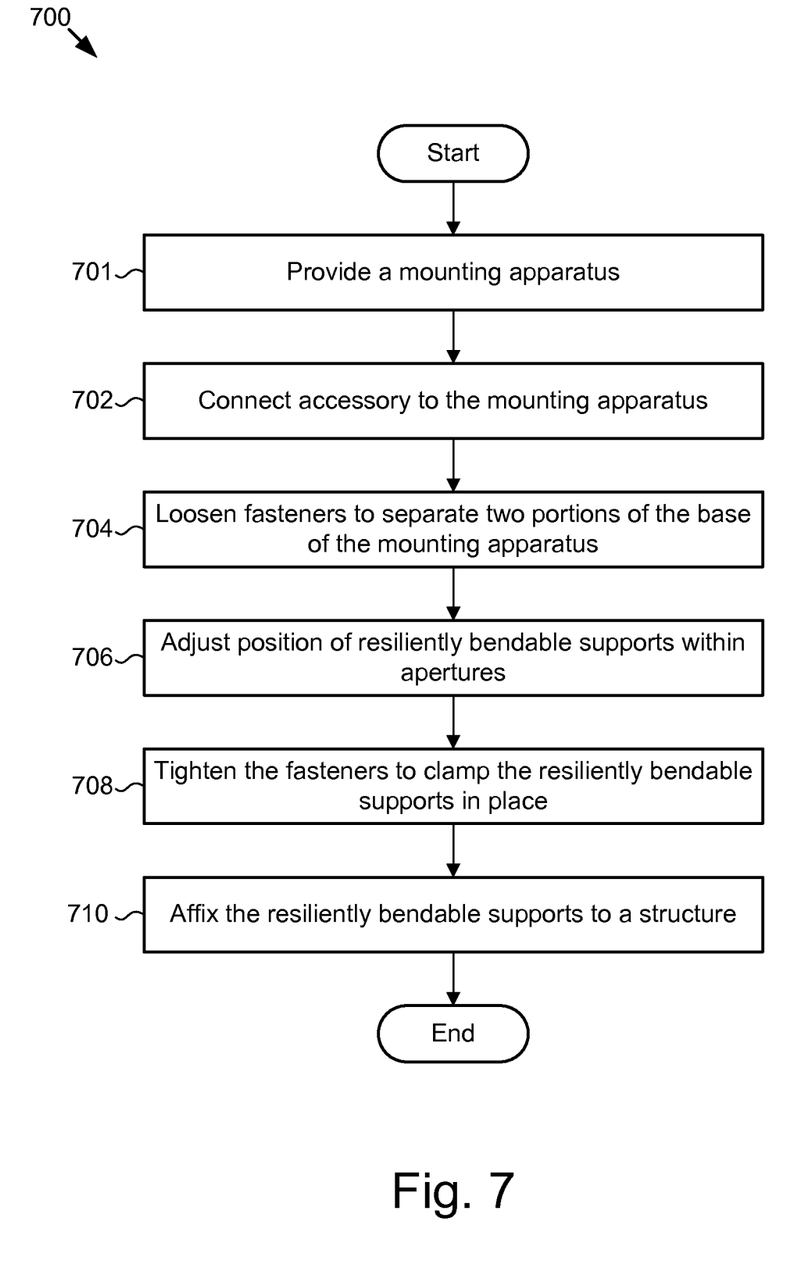
FIG. 7 is a schematic flow chart diagram of a method for mounting an accessory, according to one embodiment.

FIG. 7 is a schematic flow chart diagram of one embodiment of a method 700 for mounting an accessory 50 in a desired position relative to a structure 60, according to one embodiment. The method 700 includes providing a mounting apparatus at 701 and connecting an accessory 50 to the mounting mechanism of the mounting apparatus at 702. Additionally, the method 700 includes loosening the fasteners on the base to separate the two portions of the base at 704 and then adjusting a position of the at least one resiliently bendable support within the at least one aperture at 706. The method 700 further includes re-tightening the fasteners on the base to re-clamp the at least one resiliently bendable support between the two portions of the base at 708. Finally, the method 700 includes affixing the at least one resiliently bendable support to a structure 60 at 710.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
 a base comprising a mounting surface and at least one aperture;
 a mounting mechanism coupled to the mounting surface of the base, wherein the mounting mechanism is connectable with a mountable accessory; and
 at least one resiliently bendable support passing entirely through the at least one aperture such that a first portion of the at least one resiliently bendable support protrudes a first distance from a first end of the at least one aperture and a second portion of the at least one resiliently bendable support protrudes a second distance from a second end of the at least one aperture, wherein the first distance and the second distance are adjustable.

2. The apparatus of claim 1, wherein the at least one resiliently bendable support comprises an elongated cylindrical member comprising a core.

3. The apparatus of claim 2, wherein the core is a carbon steel alloy.

4. The apparatus of claim 2, wherein the elongated cylindrical member further comprises a plastic sheathing surrounding the core.

5. The apparatus of claim 2, wherein the elongated cylindrical member further comprises a high density foam sheathing surrounding the core.

6. The apparatus of claim 1, wherein the mountable accessory is selected from the group consisting of: a camera, a camcorder, a phone, a smart-phone, a laptop, a tablet, a mobile computing device, a portable electronic device, or a lighting fixture.

7. The apparatus of claim 1, wherein the mounting mechanism comprises hardware for detachably securing the mountable accessory.

8. The apparatus of claim 1, wherein the mounting mechanism is detachably coupled to the mounting surface.

9. The apparatus of claim 1, wherein the at least one aperture extends completely through the base from one side of the base to another side of the base.

10. The apparatus of claim 9, wherein when the at least one resiliently bendable support extends through two separate apertures, engagement between an exterior surface of the at least one resiliently bendable support and a surface defining openings of the two separate apertures is sufficient to prevent inadvertent sliding of the at least one resiliently bendable support through the apertures of the base.

11. The apparatus of claim 10, wherein the two separate apertures are adjacent to each other.

12. The apparatus of claim 10, wherein the base comprises at least twice as many apertures as resiliently bendable supports.

13. The apparatus of claim 1, wherein the base comprises two portions coupled together with fasteners, wherein the at least one resiliently bendable support is clamped between the two portions of the base.

14. The apparatus of claim 1, wherein the at least one resiliently bendable support comprises a tip feature on at least one end, wherein the tip feature facilitates engagement with a surface.

15. An apparatus comprising:
 a base comprising two portions coupled together with fasteners, wherein the base comprises a mounting surface and at least one aperture defined by semi-cylindrical channels on inwardly facing surfaces of the two portions;
 a mounting mechanism coupled to the mounting surface of the base; and
 at least one resiliently bendable support clamped between the two portions of the base within the at least one aperture;
 wherein the at least one resiliently bendable support passes entirely through the at least one aperture such that a first portion of the at least one resiliently bendable support protrudes a first distance from a first end of the at least one aperture and a second portion of the at least one resiliently bendable support protrudes a second distance from a second end of the at least one aperture, wherein the first distance and the second distance are adjustable.

16. The apparatus of claim 15, wherein the at least one aperture terminates within the base.

17. The apparatus of claim 15, wherein the at least one resiliently bendable support comprises an elongated cylindrical member comprising a core.

18. The apparatus of claim 17, wherein the core is a carbon steel alloy.

19. The apparatus of claim 17, wherein the elongated cylindrical member further comprises a plastic sheathing surrounding the core.

20. A method for mounting an accessory comprising:
providing a base comprising two portions coupled together with fasteners, wherein the base comprises a mounting surface and at least one aperture defined by semi-cylindrical channels on inwardly facing surfaces of the two portions;
providing a mounting mechanism coupled to the mounting surface of the base;
providing at least one resiliently bendable support clamped between the two portions of the base within the at least one aperture such that a first portion of the at least one resiliently bendable support protrudes a first distance from a first end of the at least one aperture and a second portion of the at least one resiliently bendable support protrudes a second distance from a second end of the at least one aperture;
connecting an accessory to the mounting mechanism;
loosening the fasteners on the base to separate the two portions of the base;
moving the at least one resiliently bendable support through the at least one aperture to adjust the first distance and the second distance;
tightening the fasteners on the base to clamp the at least one resiliently bendable support between the two portions of the base; and
affixing the at least one resiliently bendable support to a structure.

\* \* \* \* \*